United States Patent [19]
Reiss et al.

[11] Patent Number: 5,575,982
[45] Date of Patent: Nov. 19, 1996

[54] PROCESS OF PURIFYING EXHAUST GASES PRODUCED BY COMBUSTION OF WASTE MATERIALS

[75] Inventors: Guenter Reiss; Georg Schaub, both of Oberursel, Germany

[73] Assignee: Metallgesellschaft Aktiengesellschaft, Frankfurt am Main, Germany

[21] Appl. No.: 358,150

[22] Filed: Dec. 16, 1994

[30] Foreign Application Priority Data

Dec. 23, 1993 [DE] Germany ............... 43 44 113.0

[51] Int. Cl.$^6$ .................. B01D 53/50; B01D 53/64
[52] U.S. Cl. ............. 428/210; 423/240 R; 423/243.08
[58] Field of Search ............... 423/215.5, 210, 423/240 R, 243.08

[56] References Cited

U.S. PATENT DOCUMENTS

| | | | |
|---|---|---|---|
| 4,789,532 | 12/1988 | Jons et al. | 423/210 |
| 5,238,665 | 8/1993 | Lerner | 423/210 |
| 5,439,508 | 8/1995 | Mayer-Schwinning | 95/58 |

FOREIGN PATENT DOCUMENTS

| | | |
|---|---|---|
| 0253563 | 1/1988 | European Pat. Off. . |
| 0411412 | 2/1991 | European Pat. Off. . |
| 2603807 | 1/1982 | Germany . |
| 4012320 | 7/1991 | Germany . |
| 89-08493 | 9/1989 | WIPO ............... 423/210 |
| 89-11329 | 11/1989 | WIPO ............... 423/210 |
| 93-02773 | 2/1993 | WIPO ............... 423/210 |

*Primary Examiner*—Michael Lewis
*Assistant Examiner*—Peter T. DiMauro
*Attorney, Agent, or Firm*—Michael J. Striker

[57] ABSTRACT

The process purifies exhaust gas produced by combustion of waste materials including garbage, industrial wastes and/or sewage sludge. The exhaust gas is contaminated particularly with dust, $SO_2$, HCl, HF, Hg, mercury compounds, and dioxins and furans and can be expected to have an oxygen content. In the process, the exhaust gas is treated in a spray absorber with a suspension of $Ca(OH)_2$; the exhaust gas is subsequently filtered in two successive filteration stages; the exhaust gas leaving the first filtering stage still has an $SO_2$ content of from 20 to 500 mg/sm$^3$; activated carbon, preferably hearth furnace coke, is introduced into the exhaust gas stream before the second filtering stage; and the exhaust gas is finally scrubbed with a mixture which contains water and NaOH, $Na_2CO_3$, $Ca(OH)_2$ and $CaCO_3$ in a dissolved or suspended state.

19 Claims, 1 Drawing Sheet

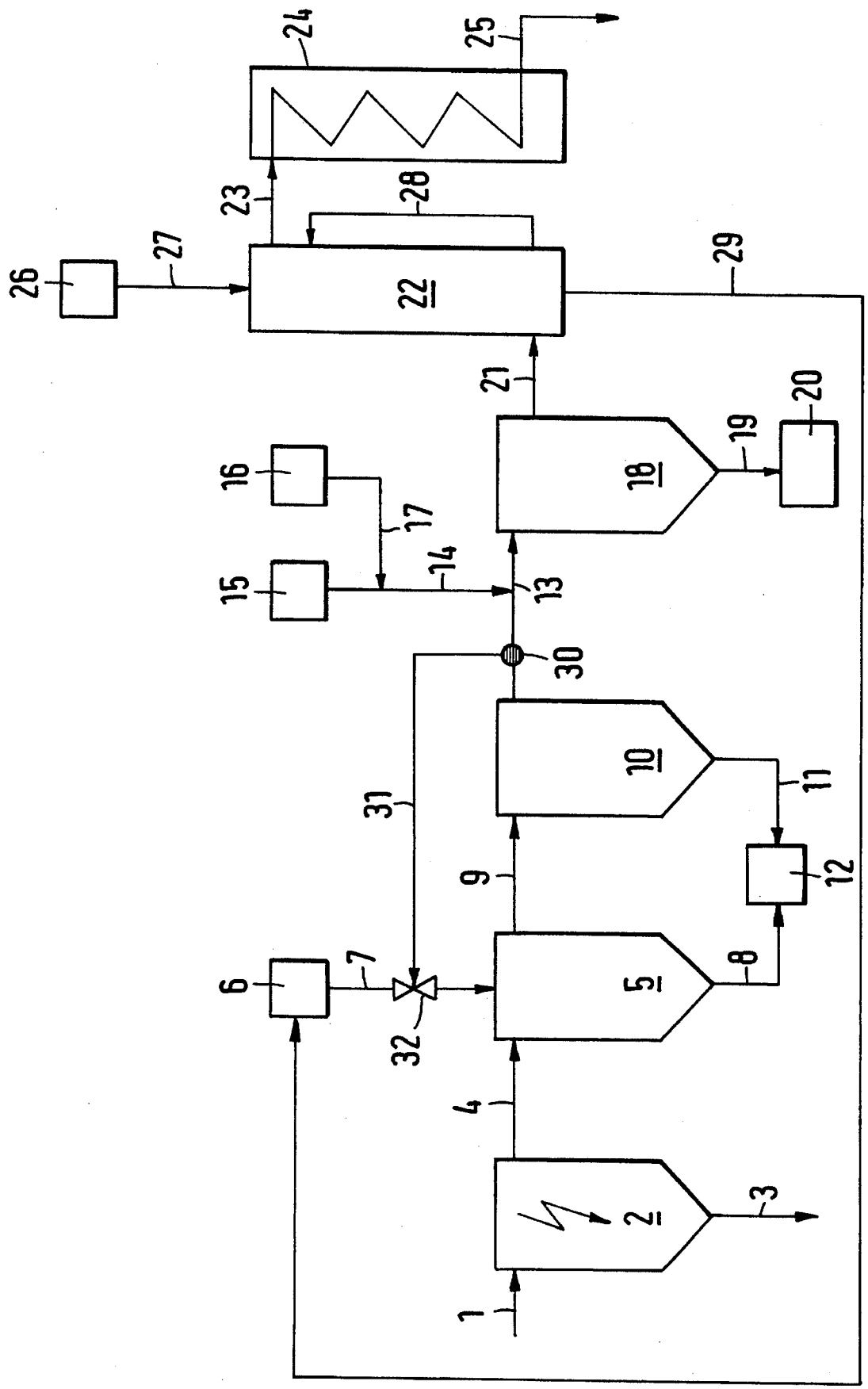

PROCESS OF PURIFYING EXHAUST GASES PRODUCED BY COMBUSTION OF WASTE MATERIALS

BACKGROUND OF THE INVENTION

This invention relates to a process of purifying an oxygen-containing exhaust gas which has been produced by combustion of garbage, industrial waste materials and sewage sludge and which is contaminated with dust, $SO_2$, HCl, HF, heavy metals, particularly Hg and mercury compounds, and with dioxins and furans.

Because of the different and changing compositions of garbage, industrial waste materials and sewage sludge, the exhaust gases produced by a combustion of these waste materials are contaminated with different amounts of substances which pollute the environment. All impurities must substantially be removed from the combustion exhaust gases before it is permissible to discharge the exhaust gases into the atmosphere because a great number of impurities even in low concentrations produce toxic effects in human beings, animals, and plants. The exhaust gases produced by combustion of waste materials are particularly contaminated with dust, $SO_2$, HCl, HF, Hg mercury compounds as well as dioxins and furans. In addition to these substances the combustion exhaust gases also contain $NO_x$, heavy metal compounds, and highly condensed aromatic hydrocarbons as further impurities. Because the waste materials are combusted with oxygen in a stoichiometric excess, the combustion exhaust gases contain 2 to 11% by volume oxygen.

The dust, which is contained in the exhaust gases in an amount of up to 50,000 $mg/sm^3$ ($sm^3$=standard cubic meter), is separated in cyclones, electrostatic precipitators, cloth filters or scrubbers and the exhaust gas to be dedusted may pass through a plurality of such units. At the present time the known dedusting processes even when carried out on a commercial scale deliver a pure gas that contains <5 $mg/sm^3$ residual dust. The dedusting must be as complete as possible because the dust mainly adsorbs toxic heavy metals, heavy metal compounds and polyhalogenated dibenzodioxins and dibenzofurans.

The $SO_2$ and HCl are each contained in the exhaust gases in an amount of up to 3000 $mg/sm^3$ and HF is also present in amounts of up to 100 $mg/sm^3$. Together with the water vapor contained in the atmosphere these gaseous compounds form acids, which are very often present as aerosols and the gaseous compounds have a toxic activity. For this reason they are substantially removed and the known purifying processes carried out on a commercial scale may result in residual contents of <20 $mg/sm^3$ $SO_2$, <5 $mg/sm^3$ HCl and <1 $mg/sm^3$ HF. Dry or quasi-dry or wet purifying processes are used to remove $SO_2$, HCl and HF, and a plurality of processes may be carried out in succession. The reactants used in these processes consist mainly of $Ca(OH)_2$, CaO, $CaCO_3$, NaOH, and $Na_2CO_3$. Spray absorption is a process which has gained special significance and in which an aqueous suspension of $Ca(OH)_2$ reacts with the acid pollutants $SO_2$, HCl and HF, the water evaporates and a solid reaction product is obtained, which contains also dust and other pollutants. Scrubbing processes are also known, by which the pollutants $SO_2$, HCl and HF can be removed to a very high degree.

The heavy metals and heavy metal compounds, mainly mercury and mercury compounds, and polyhalogenated dibenzodioxins and dibenzofurans are contained in the combustion exhaust gases in lower concentrations. But these substances have an extremely high toxic activity and, for this reason, must be almost entirely removed from the exhaust gases. This is preferably effected in the prior art by adsorption and/or scrubbing processes. Activated carbon has proved to be a particularly satisfactory adsorbent. The scrubbing processes are carried out under acid or alkaline conditions. Besides, dioxins and furans may be decomposed by catalytic conversion.

To have commercial utility, the known processes of purifying exhaust gases are required to involve only a low capital investment and low operating costs and to produce products which are obtained at a low rate and can be dumped without great difficulties. In order to remove the above-mentioned impurities to the highest possible degree, a plurality of purifying processes are usually combined.

For instance, European Patent Specification 0 253 563 discloses a process in which mercury vapor and/or vapors of deleterious organic compounds and/or nitrogen oxides are removed from a hot exhaust gas stream, which is discharged by a combustion plant and contains also fly ash and acid components—i.e., $SO_2$ and HCl—. In that known process the exhaust gas to be purified is fed at a temperature from 135° to 400° C. into an atomizing and absorbing chamber, in which an aqueous liquid is atomized, which contains a basic absorbent. In the spray absorber the exhaust gas is cooled at the same time by an evaporation of water to 180° to 90° C. The acid components of the exhaust gas are bound and a particulate material is thus formed, which contains the products of the reactions between the basic absorbent and the acid components of the exhaust gas as well as unreacted absorbent. The particulate reaction product and any fly ash which is present are separated from the exhaust gas in a particle separator downstream of the atomizing and absorbing zone. In the known process, activated carbon powder at a rate of 1 to 800 $mg/sm^3$ of exhaust gas is introduced into the exhaust gas stream at least at one location, which may be upstream of the atomizing and absorbing chamber or in the atomizing and absorbing chamber or downstream of the atomizing and absorbing chamber but upstream of the particle separator. The activated carbon powder is separated together with the particulate reaction products in the particle separator.

Besides, German Patent Specification 40 12 320 discloses a process of purifying exhaust gases which, in addition to fly ash, contain gaseous pollutants, such as $SO_2$, HCl and HF, as well as volatile heavy metals, particularly mercury compounds. That known process comprises initially a dry separation of solids and a subsequent two-stage scrubbing with a circulated scrubbing liquid. The first scrubbing stage is operated at a pH from 0 to 3 and the second scrubbing stage at a pH from 6 to 9.

It has been found that more stringent requirements for purity necessitate an improvement of the known purifying processes. It has also been found that in the known purifying processes the pollutant concentrations in the pure gas may increase for short times, particularly as a result of fluctuations of the concentrations of individual pollutants in the combustion exhaust gases, and such increases must be avoided with a view to possible hazards.

SUMMARY OF THE INVENTION

For this reason, it is an object of the present invention to provide a process for purification of exhaust gases formed by the combustion of garbage, industrial waste materials and sewage sludge which is economical and, even in case of fluctuations of concentrations of individual pollutants, reliably insures that the pure gas produced by the process contains pollutants only in low concentrations.

It is also an object of the present invention to provide a process for purifying exhaust gas which produces a pure gas containing dust in a concentration <10 mg/sm$^3$, $SO_2$ in a concentration <30 mg/sm$^3$, HCl in a concentration of <10 mg/sm$^3$, HF in a concentration of <1 mg/sm$^3$, Hg in a concentration of <0.05 mg/sm$^3$ and polyhalogenated dibenzodioxins and dibenzofurans in a concentration of <0.1 ng/sm$^3$.

The object underlying the invention is attained in a process comprising the steps of treating the exhaust gas in a spray absorber with a suspension of $Ca(OH)_2$; subsequently filtering the exhaust gas in a first and second filtering stage, the exhaust gas leaving the first filtering stage still having an $SO_2$ content from 20 to 500 mg/sm$^3$; feeding activated carbon, preferably hearth furnace coke, into the exhaust gas stream before or upstream of the second filtering stage and downstream of the first filtering stage; and finally scrubbing the exhaust gas with a mixture which contains water and NaOH, $Na_2CO_3$, $Ca(OH)_2$ and/or $CaCO_3$ in a dissolved or suspended state.

In the spray absorber a major part of the acid pollutants $SO_2$, HCl and HF as well as a large part of the fly dust, the heavy metals, the heavy metal compounds, the $NO_x$ and the dioxins and furans are removed. But the concentration of pollutants in the exhaust gases leaving the spray absorber is still so high that the exhaust gases must be subjected to further purifying steps. This is initially effected in the two filtering stages. The solid particles entrained out of the spray absorber are removed in the first filtering stage, in which an after-reaction also occurs between the acid components $SO_2$, HCl and HF and the $Ca(OH)_2$ which has been entrained from the spray absorber. But the exhaust gas leaving the first filtering stage still contains particularly mercury and $SO_2$ in concentrations which must be removed in the succeeding purifying stages. For this reason the activated carbon is admixed with the exhaust gas stream before it enters the second filtering stage and is removed from the exhaust gas stream in the second filtering stage. In the filter cake of the second filtering stage a major part of the $SO_2$ is oxidized to $SO_3$ and the mercury, particularly the metallic mercury, is removed at the same time. The exhaust gases leaving the second filtering stage are free of mercury and contain $SO_2$ in such a low concentration that they may be after-purified in a scrubber because the succeeding scrubbing stage only removes small amounts of $SO_2$ from the exhaust gas and this can be accomplished with relatively expensive sorbents. Besides, the filter cake of the second filtering stage desirably contains no solid reaction products from the spray absorber.

Whereas German Patent Specification 26 03 807 discloses a process in which impregnated regenerable activated carbon is used to remove mercury from gases and the removal of mercury is improved when the activated carbon is impregnated with 5 to 50 g sulfuric acid and 0.1 to 5 g iodine ions per 100 g of activated carbon, and whereas it is proposed in Published European Patent Application 0 411 412 that exhaust gases which are contaminated with mercury and with sulfur compounds may be purified in a fixed-bed absorber which is filled with activated carbon, it has surprisingly been found that a $SO_2$ concentration of from 20 to 500 mg/sm$^3$ is sufficient to promote the separation of mercury by an adsorption on activated carbon to such a degree that the mercury, particularly the metallic mercury, is virtually entirely separated in a filter cake which consists of a relatively thin layer of activated carbon.

To avoid a loading of the spray absorber with dust at a substantial rate, according to the invention before entering the spray absorber the exhaust gas is dedusted at 200° to 500° C. in a cyclone and/or in an electric precipitator. As a result, a major part of the dust, which consists of fly ash, is separated from the exhaust gas and the solid reaction product which is formed in the spray absorber is substantially free of fly ash. Separate recovery of the several products of the process affords advantages when they are being dumped.

The process in accordance with the invention can be carried out in a particularly desirable manner if the exhaust gas leaving the first filtering stage has an $SO_2$ content of 100 to 300 mg/sm$^3$. Because of that $SO_2$ content a removal of almost all of the mercury is reliably insured.

In accordance with a preferred embodiment of the invention filtering in the two filtering stages of the process is carried out in two separate cloth filters. Alternatively, the filtering in the first filtering stage is carried out in an electrostatic precipitator and the second filtering stage, in a cloth filter. Two cloth filters permit a particularly reliable separation of the dust-like solid particles. The use of an electrostatic precipitator in the first filtering stage involves only low costs and may particularly be adopted if the exhaust gas leaving the spray absorber has only a relatively low solids content. The use of a cloth filter in the second filtering stage has been found to be particularly desirable because a relatively thin layer of activated carbon deposits on the cloth filter and in combination with the $SO_2$ content called for by the invention in the exhaust gas supplied to the second filtering stage is sufficient to insure removal of almost all mercury.

In accordance with the invention, 0.03 to 1 g of activated carbon per sm$^3$ of exhaust gas is introduced into the exhaust gas stream before it enters the second filtering stage. With a supply of activated carbon at that rather low rate, the process can be carried out economically and mercury is removed to a high degree.

In accordance with a preferred embodiment of the invention the mixture used to scrub the exhaust gas has a pH from 4.5 to 8. That mode of operating the scrubbing stage minimizes the consumption of chemicals and insures a substantially complete removal of the acid pollutants $SO_2$, HCl and HF, which are still contained in the exhaust gases leaving the second filtering stage.

According to a preferred feature of the invention the exhaust gas is at a temperature from 200° to 500° C. as it enters the spray absorber and is at a temperature from 60° to 180° C. as it leaves the spray absorber. It is possible to select a low temperature for the exhaust gas stream leaving the spray absorber if the exhaust gas has a low HCl content and a higher temperature must be selected there for an exhaust gas stream having a relatively high HCl content. In accordance with a further feature of the invention the exhaust gas stream entering the second filtering stage is at a temperature from 60° to 180° C. It must be ensured that the temperature of the exhaust gas stream is not lowered in the first filtering stage.

It has been found that it is particularly desirable to use an activated carbon which has an average particle diameter from 1 to 200 micrometers, preferably from 1 to 80 micrometers, because with those particle diameters the activated carbon can effectively be introduced into the exhaust gas stream and causes an optimum adsorption within the time which is available for reaction.

To increase the safety of the process in accordance with the invention, $CaCO_3$ and/or fly ash can be admixed into the activated carbon and the weight ratio of activated carbon to $CaCO_3$ and/or fly ash in the admixing is 1:0.3 to 1:5. These substances cause a dilution and reliably avoid a self-ignition of the activated carbon.

Finally in accordance with a preferred embodiment of the invention the mass flow rate at which $Ca(OH)_2$ is supplied to the spray absorber is continuously automatically controlled so that the exhaust gas entering the second filtering stage has an $SO_2$ content in the range from 20 to 500 mg/sm$^3$, preferably from 100 to 300 mg/sm$^3$. It has been found that the $SO_2$ content of the exhaust gas entering the second filtering stage may be utilized as a controlling parameter in the automatic control of the supply of the suspension of $Ca(OH)_2$ to the spray absorber because the absorption of $SO_2$ is relatively rapidly absorbed in the spray absorber at an almost constant temperature so that the automatic control process has a minimal inertia.

BRIEF DESCRIPTION OF THE DRAWING

The objects, features and advantages of the present invention will now be illustrated in more detail by the following detailed description, reference being made to the accompanying drawing in which the sole figure is a schematic diagram of a plant for performing a preferred embodiment of the process in accordance with the invention.

DESCRIPTION OF THE PREFERRED EMBODIMENT

The exhaust gas from a plant for burning sewage sludge had a dust content of 14,000 mg/sm$^3$, a $SO_2$ content of 1500 mg/sm$^3$, an HCl content of 80 mg/sm$^3$, an HF content of 10 mg/sm$^3$ and a mercury content of 1.5 mg/sm$^3$. The exhaust gas contained mercury mainly as mercury metal vapor. At a temperature of 300° C. the exhaust gas is fed from line 1 to the electrostatic precipitator 2, in which a major part of the dust is separated and then discharged through line 3. From the electrostatic precipitator 2 the prededusted exhaust gas is conducted through line 4 to the spray absorber 5. The prededusted exhaust gas has a residual dust content of 300 mg/sm$^3$ and a temperature of 250° C.

From the storage tank 6 an aqueous suspension of $Ca(OH)_2$ is supplied through line 7 to the spray absorber 5. When the suspension is fed into the spray absorber, the water in it evaporates. The solid reaction product, which contained a major part of the $SO_2$, of the HCl and of the HF, is delivered through line 8 to the storage bin 12. The solid reaction product contained also small amounts of $Ca(OH)_2$. The exhaust gas leaving the spray absorber 5 through line 9 is at a temperature of 110° C. and has an $SO_2$ content of 120 mg/sm$^3$.

The exhaust gas is conducted in line 9 to a cloth filter 10, which is operated at a temperature of about 110° C. The solid reaction products entrained by the exhaust gas leaving the spray absorber were separated in the cloth filter 10 and were conveyed through line 11 to the storage bin 12. The storage bin 12 contained a uniform reaction product, which contained also a small amount of dust. The exhaust gas is conducted from the cloth filter 10 through line 13 to the cloth filter 18. The exhaust gas line 13 includes a mixing section, which is fed activated carbon powder having a particle size of from 1 to 50 micrometers at a rate of 250 mg per sm$^3$ of exhaust gas from the storage supply bin 15 through line 14. Besides, fly ash from the storage bin 16 is admixed into the exhaust gas stream conducted in line 13 at a rate of 700 mg/sm$^3$ through lines 17 and 14 to increase the safety of operation of the cloth filter 18. The fly ash contained in the storage bin 16 came from the electrostatic precipitator 2. The exhaust gas conducted in line 13 had an $SO_2$ content of 100 mg/sm$^3$ and a mercury content of 1.5 mg/sm$^3$. The activated carbon is periodically removed from the cloth filter 18 and is supplied through line 19 to the storage bin 20. The exhaust gas leaving the cloth filter 18 had a $SO_2$ content of 40 mg/sm$^3$ and is supplied through line 21 to the scrubber 22, which is operated with a solution of NaOH and $Na_2CO_3$. That solution is supplied to the scrubber 22 from the storage vessel 26 through line 27 at a rate which is chosen so that a pH of about 7.5 is always maintained in the scrubber. The scrubbing solution is circulated by a pump in an internal scrubbing circuit 28. A partial stream of the scrubbing solution is constantly taken from the scrubber 22 through line 29 and supplied via the storage tank 6 to the spray absorber 5. The scrubbing solution taken from the scrubber 22 is replaced at the same rate by fresh scrubbing solution through line 27.

The exhaust gas leaving the scrubber 22 through the line 23 is reheated to a temperature of about 110° C. in the heat exchanger 24 and is conducted through line 25 into a chimney. In the heat exchanger 24 the heat content of a partial stream of the combustion exhaust gases is utilized; this is not shown in the drawing. The purified exhaust gas conducted in line 25 had a dust content of <10 mg/sm$^3$, an $SO_2$ content of <30 mg/sm$^3$, an HCl content of <5 mg/sm$^3$, and an HF content of <1 mg/sm$^3$. The contents of mercury, mercury compounds, and polyhalogenated dibenzodioxins and dibenzofurans in the exhaust gas conducted in line 25 were less than 0.05 mg/sm$^3$ and less than 0.1 ng/sm$^3$ respectively.

For an automatic control of the process of purifying exhaust gas, the $SO_2$ content of the exhaust gas stream conducted in line 13 is continuously measured by the analyzer 30. In response to a decrease of the $SO_2$ content below the desired value of 100 mg/sm$^3$, the valve 32 is controlled via the control line 31 to decrease the rate at which $Ca(OH)_2$ is supplied to the spray absorber 5 in line 7. In response to a rise of the $SO_2$ content of the exhaust gas stream conducted in line 13 to a value in excess of 100 mg/sm$^3$, the rate at which $Ca(OH)_2$ is supplied in line 7 to the spray absorber 5 is correspondingly increased. A major part of the $SO_2$ entering the cloth filter 18 is oxidized to $SO_3$ by the oxygen contained in the exhaust gas under the catalytic action of the activated carbon and is adsorbed by the activated carbon as $H_2SO_4$. The mercury contained in the exhaust gas is almost entirely adsorbed very quickly at the same time. The laden activated carbon which had been collected in the storage bin 20 is returned to the cloth filter 18 in order to improve the utilization of the adsorption capacity of the activated carbon. A partial stream of the laden activated carbon is continuously taken from the storage bin and dumped.

While the invention has been illustrated and embodied in a process for purifying exhaust gas from combustion of waste materials, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

What is claimed is:

1. A process of purifying an oxygen-containing exhaust gas produced by combustion of waste materials including at least one member of the group consisting of garbage, industrial waste and sewage sludge, wherein said exhaust gas contains dust, $SO_2$, HCl, HF, heavy metal-containing substances and dioxins and furans, said heavy metal-containing substances including mercury and mercury compounds, said process comprising the steps of:

a) treating the exhaust gas with a suspension of $Ca(OH)_2$ in a spray absorber;

b) after the treating in step a), filtering the exhaust gas in a first filtering stage and a second filtering stage following the first filtering stage so that the exhaust gas leaving the first filtering stage has an $SO_2$ content of from 20 to 500 $mg/sm^3$;

c) feeding activated carbon into the exhaust gas upstream of the second filtering stage and downstream of the first filtering stage, and almost entirely absorbing the mercury contained in the exhaust gas; and d) after the first and second filtering stage, scrubbing the exhaust gas with a mixture containing water and at least one mixture component selected from the group consisting of NaOH, $Na_2CO_3$, $Ca(OH)_2$ and $CaCO_3$.

2. A process according to claim 1, further comprising dedusting the exhaust gas at 200° to 500° C. prior to said treating before the exhaust gas enters the spray absorber.

3. A process according to claim 2, wherein said dedusting is performed in a cyclone.

4. A process according to claim 2, wherein said dedusting is performed in an electric precipitator.

5. A process according to claim 1, wherein said $SO_2$ content of said exhaust gas leaving the first filtering stage is from 100 to 300 $mg/sm^3$.

6. A process according to claim 1, wherein the filtering of the two filtering stages is performed in two separate cloth filters.

7. A process according to claim 1, wherein the filtering of the first filtering step is carried out in an electrostatic precipitator and the filtering of the second filtering step, in a cloth filter.

8. A process according to claim 1, wherein from 0.03 to 1 g of said activated carbon per $sm^3$ of said exhaust gas is fed into the exhaust gas during said feeding.

9. A process according to claim 1, wherein said mixture used in said scrubbing has a pH of from 4.5 to 8.

10. A process according to claim 1, wherein said exhaust gas is at a temperature of from 200° to 500° C. while entering the spray absorber in the treating and is at a temperature of from 60° to 180° C. while leaving the spray absorber.

11. A process according to claims 1, wherein the exhaust gas is at a temperature of from 60° to 180° C. while entering the second filtering stage.

12. A process according to claim 1, wherein said activated carbon has an average particle diameter of from 1 to 200 micrometers.

13. A process according to claim 12, wherein said average particle diameter is from 1 to 80 micrometers.

14. A process according to claim 1, further comprising admixing at least one member selected from the group consisting of $CaCO_3$ and fly ash prior to the feeding of the activated carbon into the exhaust gas in a weight ratio of said activated carbon to said at least one member of 1:0.3 to 1:5.

15. A process according to claim 1, further comprising continuously automatically controlling a mass flow rate at which said $Ca(OH)_2$ is supplied to the spray absorber so that the exhaust gas entering the second filtering stage has said $SO_2$ content in the range from 20 to 500 $mg/sm^3$.

16. A process according to claim 15, wherein said $SO_2$ content of the exhaust gas entering the second filtering stage is from 100 to 300 $mg/sm^3$.

17. A process according to claim 1, wherein said activated carbon consists of hearth furnace coke.

18. A process according to claim 1, wherein said at least one mixture component is present in said mixture in a dissolved state.

19. A process according to claim 1, wherein said at least one mixture component is present in said mixture in a suspended state.

* * * * *